(12) United States Patent  
Sasaki et al.

(10) Patent No.: US 6,502,993 B2  
(45) Date of Patent: Jan. 7, 2003

(54) SEALING SYSTEM FOR A SPHERICAL BEARING

(75) Inventors: Gen Sasaki, Miyota-machi (JP); Makoto Fujino, Miyota-machi (JP); Kennosuke Kariya, Miyota-machi (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 09/912,303

(22) Filed: Jul. 26, 2001

(65) Prior Publication Data

US 2002/0025091 A1 Feb. 28, 2002

(30) Foreign Application Priority Data

Aug. 10, 2000 (JP) ......................................... 2000-242664

(51) Int. Cl.⁷ ............................................. F16C 33/74
(52) U.S. Cl. ....................................................... 384/145
(58) Field of Search .................................. 384/145, 146, 384/498, 558, 206

(56) References Cited

U.S. PATENT DOCUMENTS 3,588,201 A * 6/1971 Schmidt ...................... 384/147  
3,848,938 A * 11/1974 Stella et al. ................. 384/146

* cited by examiner

Primary Examiner—Lenard A. Footland  
(74) Attorney, Agent, or Firm—Oliff & Berridge, PLC

(57) ABSTRACT

A sealing system of a spherical bearing is constituted in such a manner that annular seal grooves are provided on an inner spherical surface of an outer race with a given space from an edge of the spherical surface, seals are fit in the seal grooves and abut against a spherical surface of an inner race. With this construction, the sealing system of the spherical bearing is easily formed with a high sealing function by tightly abutting the seals fitted in the grooves to the spherical surface of the inner race.

2 Claims, 7 Drawing Sheets

SEALING SYSTEM FOR A SPHERICAL BEARING

BACKGROUND OF THE INVENTION

1. Field of the Invention

The present invention relates to a sealing system for a spherical bearing in which a spherical surface of a split inner race is supported by an inner spherical surface of an outer race.

2. Description of the Related Art

As shown in FIGS. 6 and 7, a spherical bearing 31 in which a spherical surface 33a of an inner race 33 is slidably supported by an inner spherical surface 32a of an outer race 32 has been known. In the spherical bearing 31 a shaft not shown fixed in an axial hole 33b provided on the inner race 33 is supported rotatably and oscillatory. There has been provided with a spherical bearing 31 wherein the inner race 33 is split at a given split surface 33c in such a manner that the inner race 33 is easily inserted into the inner spherical surface 32a of the outer race 32 when being assembled. Further, when sealing the spherical bearing 31 in a conventional method, a seal 35 made of silicon, nylon or rubber is hold by an annular retainer 34 made of steel while a side end portion of the retainer 34 is welded to an end surface 32b of the outer race 32 by means of an electron beam as shown in FIGS. 6 and 7.

However, when the retainer 34 holding the seal 35 is connected to both end surfaces 32b of the outer race 32, the retainer 34 is welded to each of the end surfaces 32b through a different process resulting in additional processes and time. Moreover, since the end surface 32b requires high flatness for the sealing system, processing the outer race 32 becomes more complicated. Furthermore, when the spherical bearing 31 is fixed by abutting the end surface 32b of the outer race 32 to the housing not shown, the sealing is not possible. As shown in FIGS. 6 and 7, in a structure to mount the seal 35 to the retainer 34, the seal 35 may be twisted while the inner race 33 is under a sliding operation and a gap is generated between the seal 35 and the spherical surface 33a of the inner race 33 resulting in a deterioration of the sealing function. In this case, the retainer 34 once fixed needs to be removed from the end surface 32b of the outer race 32 for welding again. And, since the sealing system is formed in such a manner that the seal 35 is extended inside an edge portion 32c of the inner spherical surface 32a of the outer race 32, the seal 35 gives a limitation to a swing angle of a shaft not shown fitted to the inner race 33 resulting in a difficulty to obtain a desired swing angle.

SUMMARY OF THE INVENTION

The present invention has been made in the light of the above, and an object of the present invention is to provide a sealing system of a spherical bearing in such a manner as to maintain a high sealing function with a simple structure and to avoid a limitation of a swing angle.

In order to attain the above object, according to a first aspect of the present invention, in a sealing system of a spherical bearing wherein spherical surfaces of a split type inner race is slidably supported by an inner spherical surface of an outer race, an annular seal groove is provided to the inner spherical surface of the outer race with a given space from an edge of the inner spherical surface of the outer race.

With this construction, the spherical bearing can be sealed in such a manner as to abut the seal fitted in the seal groove to the spherical surface of the inner race.

According to a second aspect of the present invention, a side wall of a seal groove wherein a seal is fit is bent inside.

With this construction, the seal is fixed more tightly to the seal groove by a deformation of a section of the seal groove. And, a sealing function can be improved by closely abutting the seal to the spherical surface of the inner race in such a manner that the seal is deformed.

DESCRIPTION OF THE PREFERRED EMBODIMENTS

Figure 1:
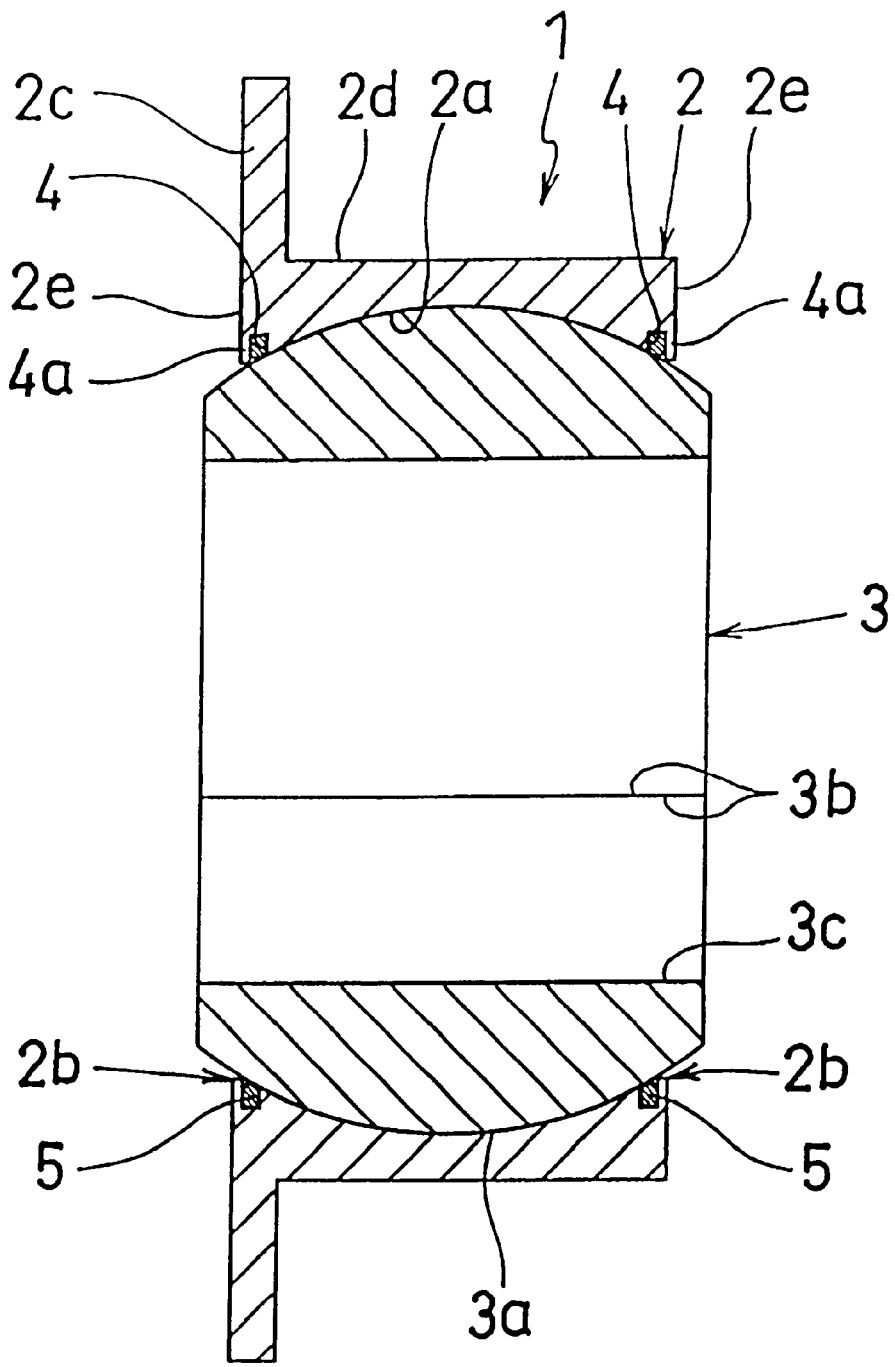
FIG. 1 is an explanatory drawing of a sealing system for a spherical bearing of an embodiment of the present invention.

An embodiment of a sealing system of a spherical bearing of the present invention is explained with reference to FIGS. 1–5. First, an outline thereof is hereinafter explained. The sealing system of a spherical bearing 1 of the embodiment of the present invention as shown in FIG. 1 is constituted in such a manner that annular seal grooves 4 are provided on an inner spherical surface 2a of an outer race 2 with a given space from edges 2b of the inner spherical surface 2a, seals 5 are fitted in the seal grooves 4, and the spherical bearing 1 is sealed by abutting the seals 5 to a spherical surface 3a of an inner race 3. Further, a sealing function is improved in such a manner as to fix the seals 5 tightly by the seal grooves 4 by deforming a section of the seal grooves 4 through bending side walls 4a of the seal grooves 4 fitted into the seal 5 and to abut the seal 5 to the spherical surface 3a of the inner race 3 by deforming the seal 5.

Next, a constitution of the spherical bearing 1 of the embodiment of the present invention is hereinafter explained. As shown in FIG. 1, the spherical bearing 1 of the embodiment of the present invention is constituted as that the spherical surface 3a of the inner race 3 is slidably supported by the inner spherical surface 2a of the outer race 2. The outer race 2 is substantially formed in a cylindrical shape with a flange 2c on its one side and its outer circumference 2d is fit in a housing not shown. And, the inner spherical surface 2a formed in the inner surface of the outer race 2 is coated with a sliding liner such as fluorescent resin. And, as shown in FIG. 1, the inner race 3 is split into two at a split surface 3b so as to achieve an easy insertion into the inner spherical surface 2a of the outer race 2, and a shaft hole 3c in which a shaft not shown is fixed is formed inside thereof. Further, this spherical bearing 1 is structured in such a manner that a shaft fixed in the shaft hole 3c of the inner race 3 is rotatably and oscillatory supported by sliding the spherical surface 3a of the inner race 3 on the inner spherical surface 2a of the outer race 2 through the sliding liner.

Figure 2:
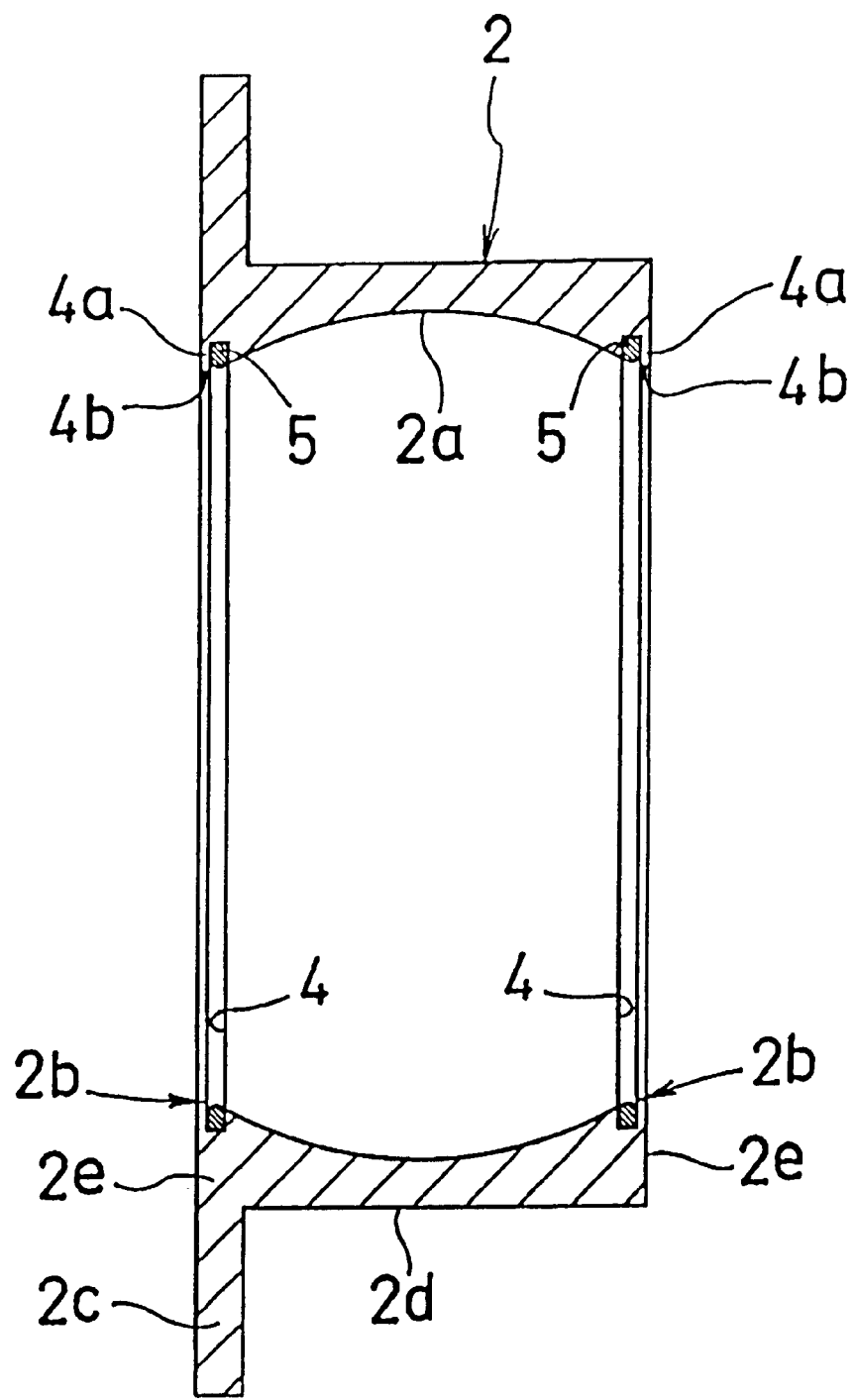
FIG. 2 is a sectional view of an outer race of the embodiment of spherical bearing, particularly showing a state where a seal is fit in a groove for sealing.
Figure 3:
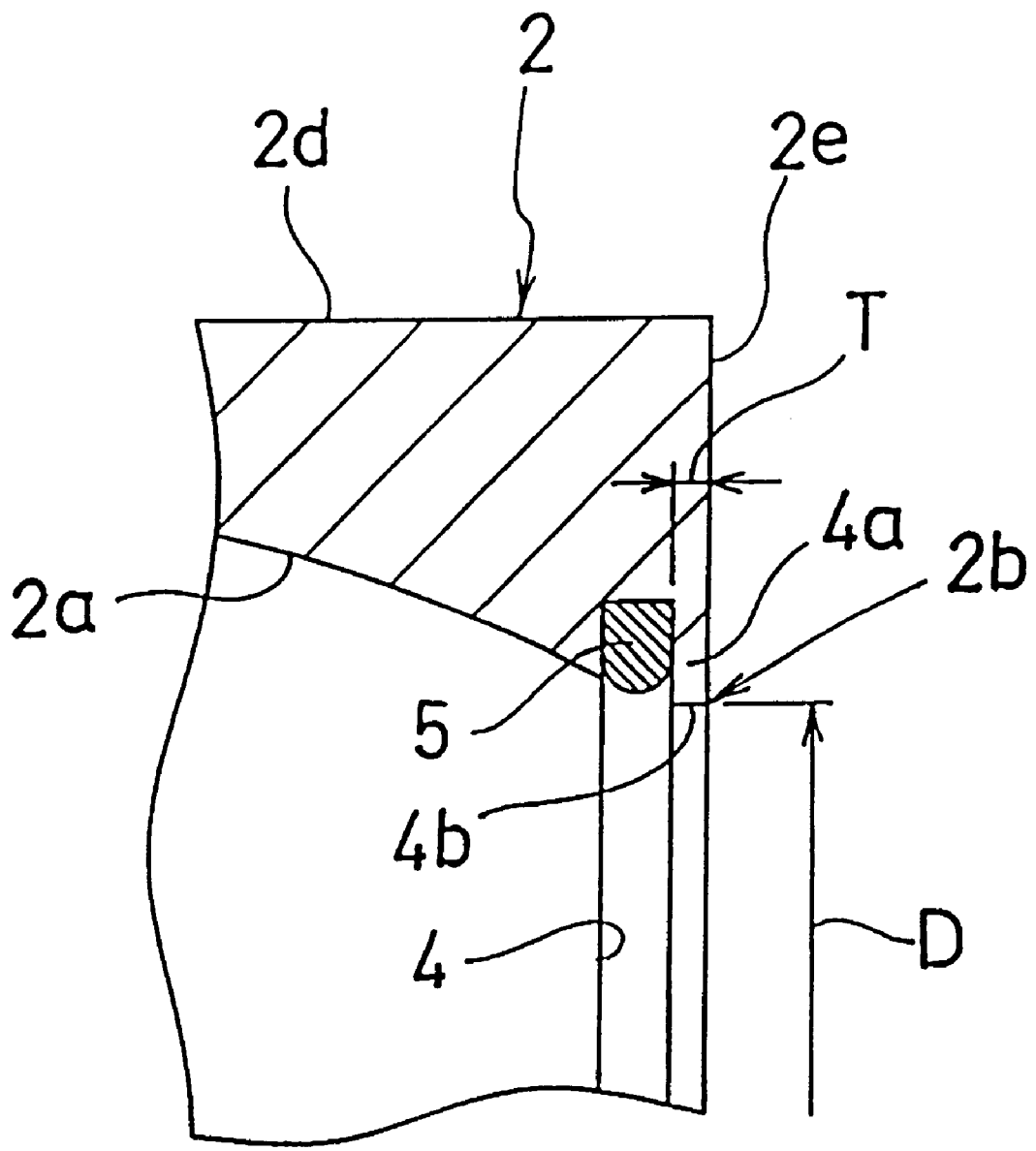
FIG. 3 is an enlarged view of a portion shown in FIG. 2.

Next, an embodiment of the sealing system of the spherical bearing 1 is explained in detail. The sealing system of the spherical bearing 1 of the embodiment of the present invention is constituted with seal grooves 4 formed on both sides on the inner spherical surface 2a of the outer race 2 and seals 5 fitted in the seal grooves 4. And, as shown in FIGS. 1–3, the seal grooves 4 are annularly formed on the inner spherical surface 2a of the outer race 2 with a side wall 4a having a given thickness (T in FIG. 3) defined by a distance between the seal grooves 4 and the end faces 2e of the outer race 2. For reference, as shown in FIG. 3, an end surface 4b of the side wall 4a of the seal groove 4 is formed in a given diameter D in FIG. 3 so as to avoid an interference with a shaft not shown fixed in the inner race 3 which secures a swingable range of the shaft. And, the annularly formed seal 5 is made of silicon, nylon or rubber, and an inside curvature of the seal 5 is closely abutted to the spherical surface 3a of the inner race 3 to form a sealing system of the spherical bearing 1.

Figure 4:
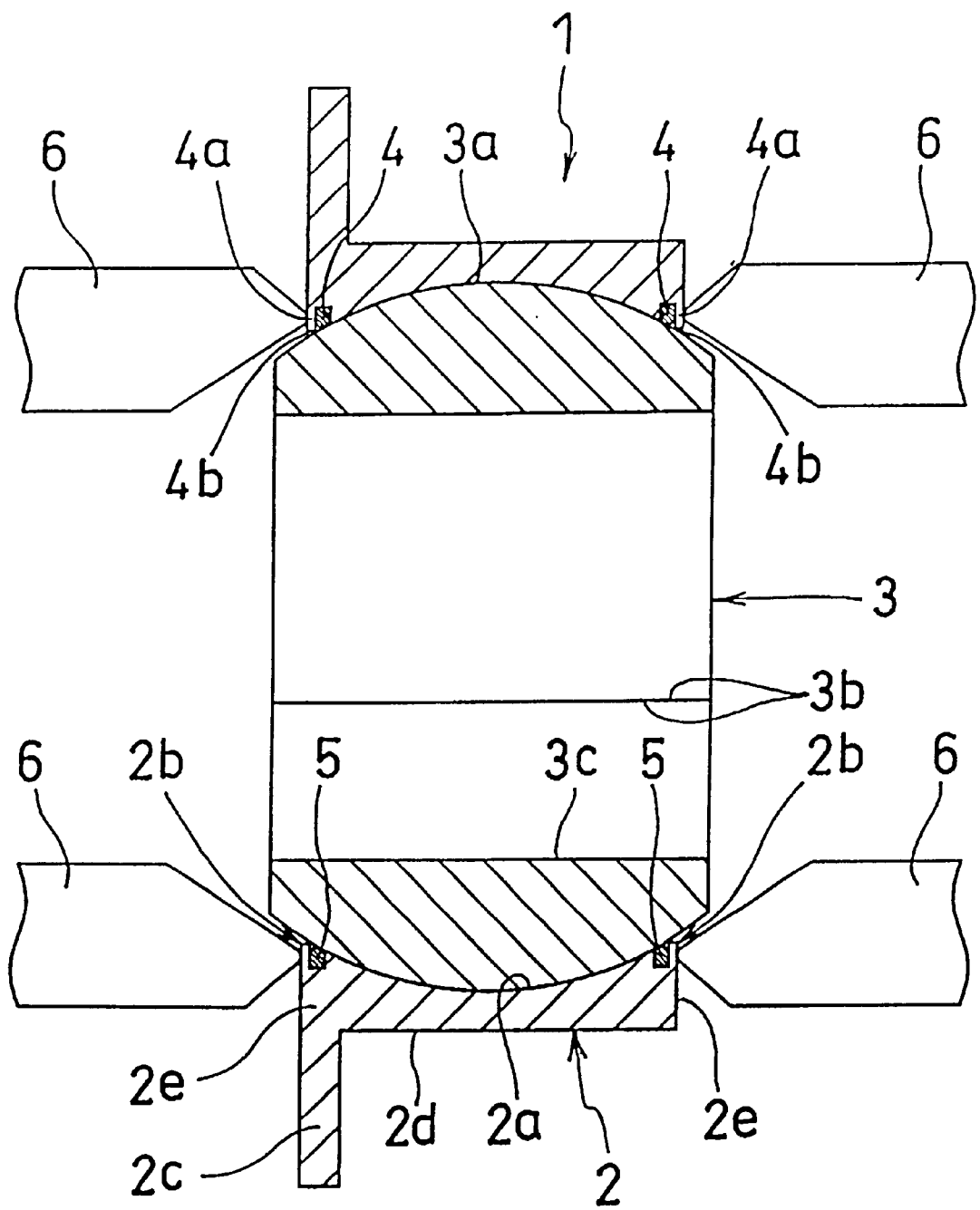
FIG. 4 is an explanatory drawing of a sealing system for a spherical bearing of an embodiment of the present invention, particularly showing a state where a side wall of a seal groove is bent by a press die.
Figure 5:
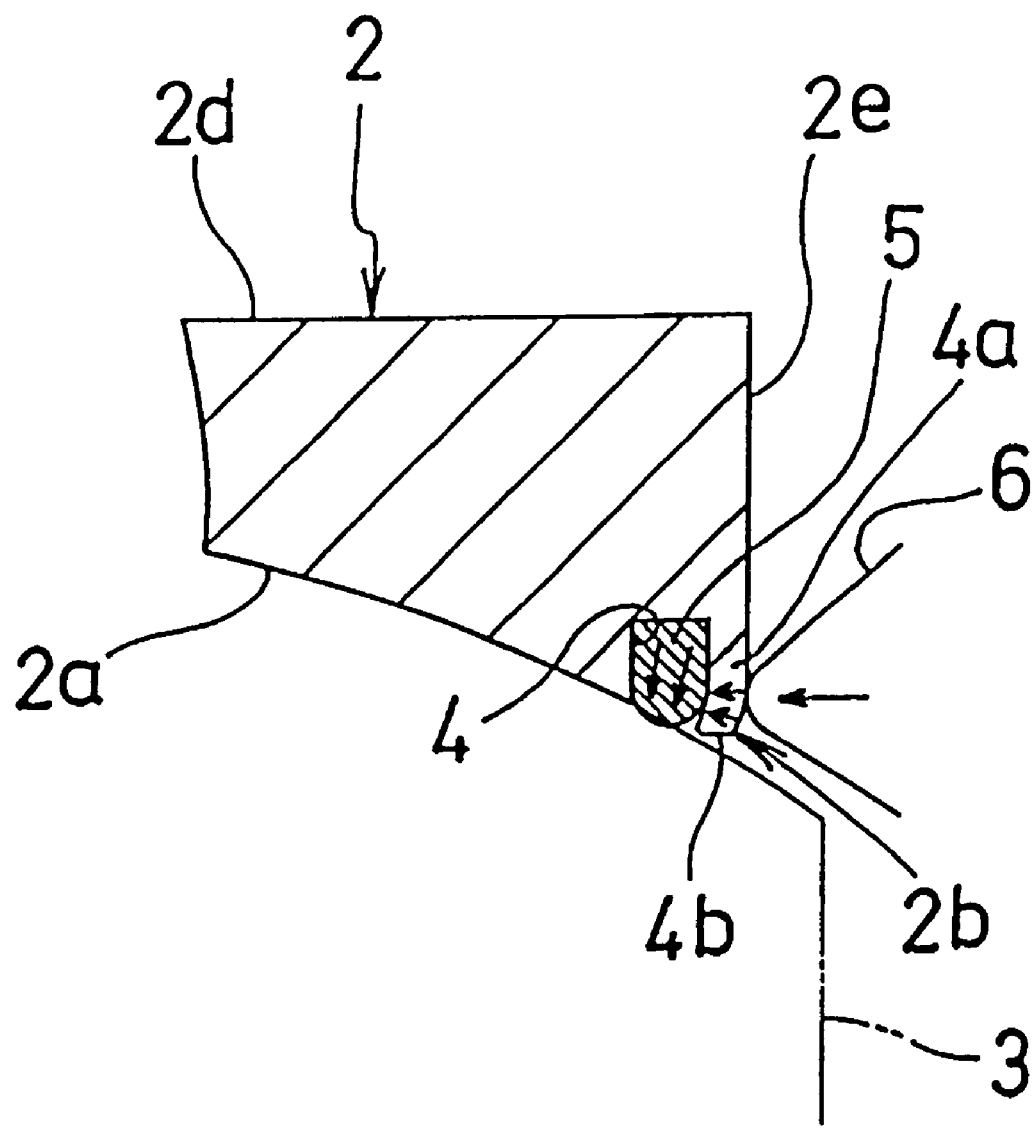
FIG. 5 is an explanatory drawing of a sealing system for a spherical bearing of an embodiment of the present invention, particularly showing a state where a side wall of a seal groove is deformed by being bent with the press die.

Further, as shown in FIGS. 4 and 5, the side wall 4a of the seal groove 4 is deformed by being bent inward with a press die 6 so as to tightly fit the seal 5 to the seal groove 4. And, since the seal 5 is pressed by the deformation of the side wall 4a, the inside curvature of the seal 5 is further tightly abutted to the spherical surface 3a of the inner race 3 so as to improve the sealing function of the spherical bearing 1.

Figure 6:
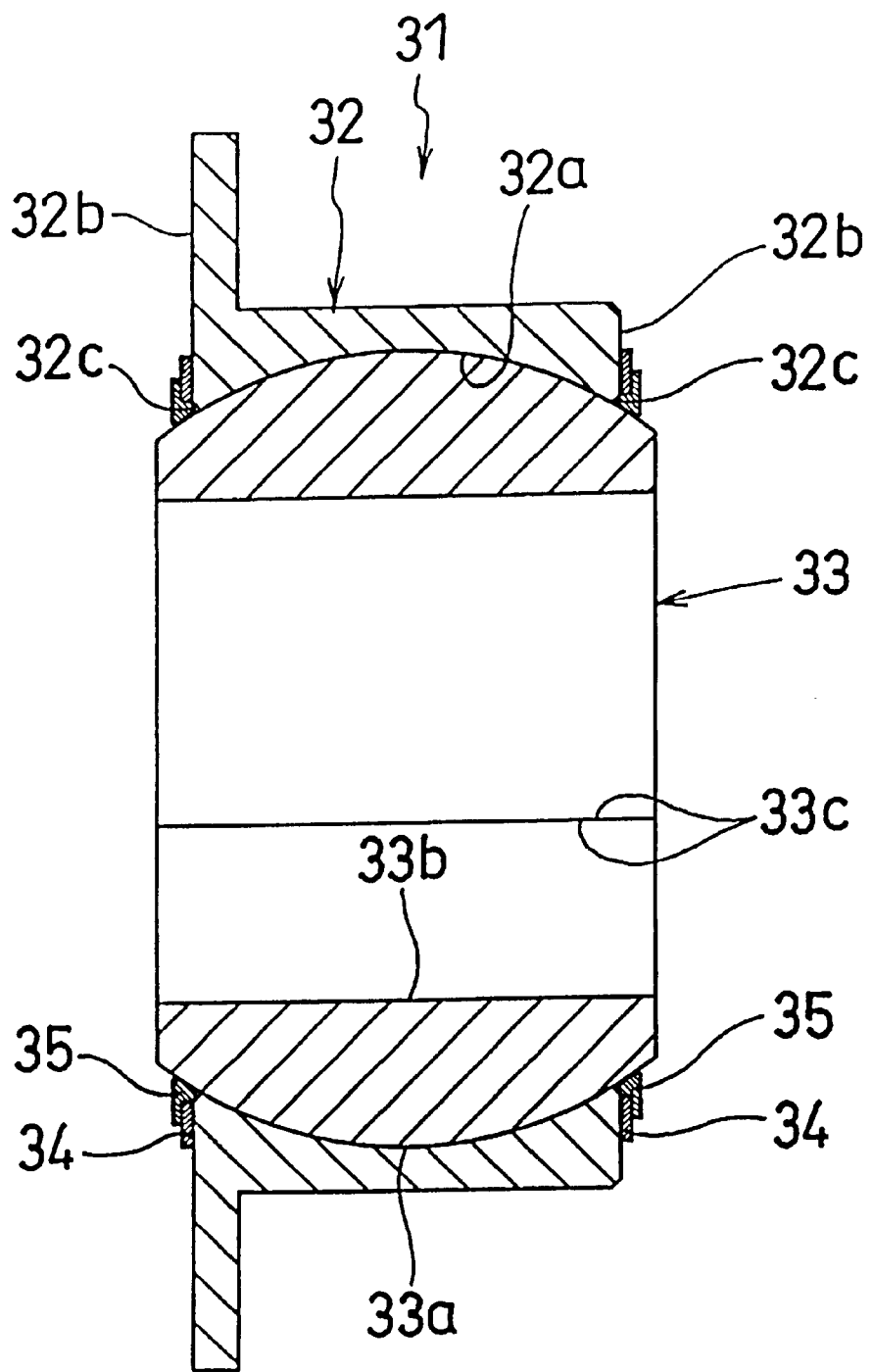
FIG. 6 is a sealing system of a conventional spherical bearing.
Figure 7:
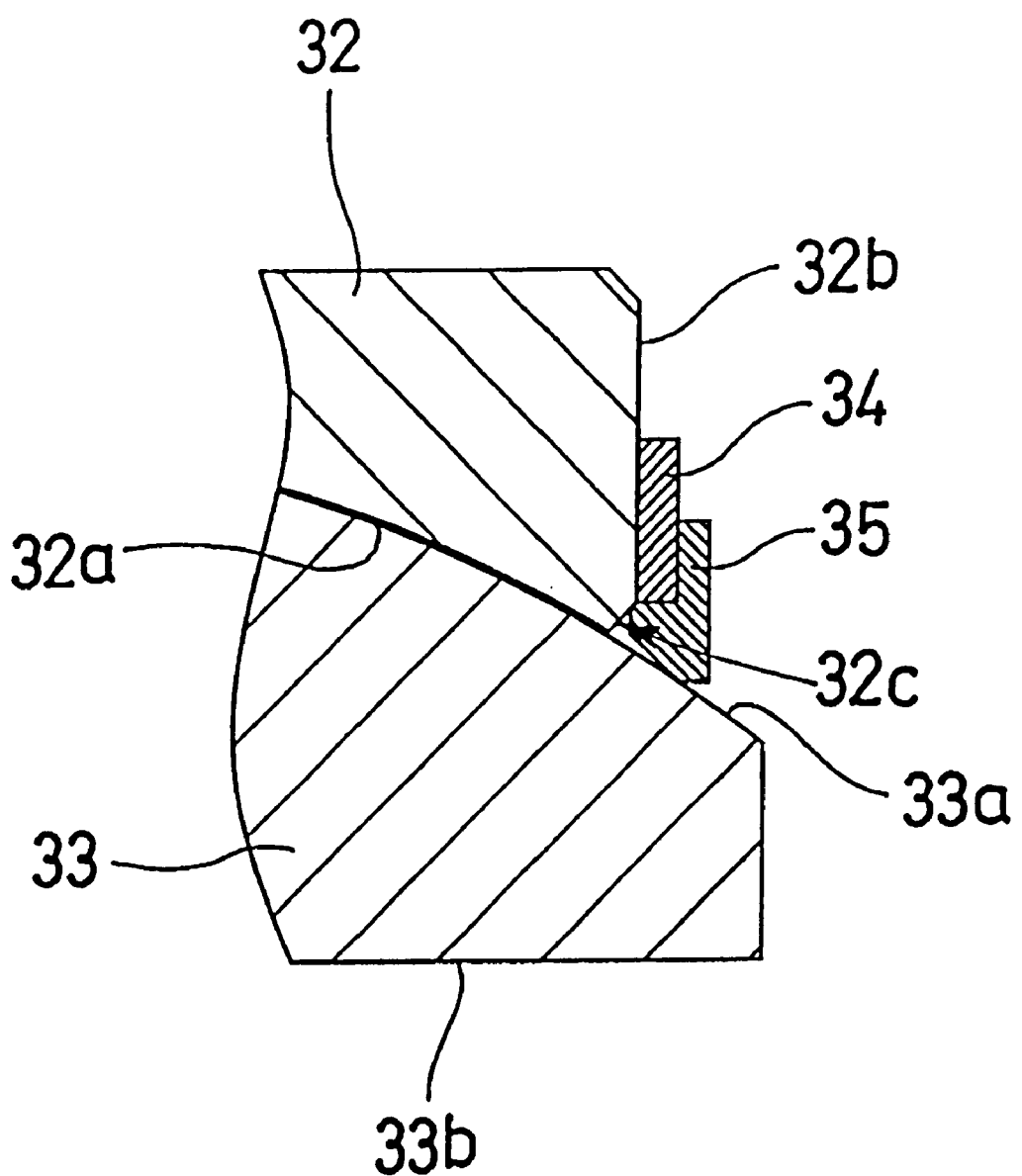
FIG. 7 is an enlarged view of a portion shown in FIG. 6.

A function of a sealing system of an embodiment of a spherical bearing is hereinafter explained. The sealing system of the spherical bearing 1 of the embodiment of the present invention is constituted in such a manner that the annular seal grooves 4 are formed on the inner spherical surface 2a of the outer race 2 and the seal 5 fitted in the seal groove 4 is abutted to the spherical surface 3a of the inner race 3 thereby avoiding connecting the retainer 34 provided with the seal 35 to the end surface 32b of the outer race 32 by welding, etc. which has been performed by the conventional sealing system of the spherical bearing 31 (see FIGS. 6 and 7). Accordingly, manufacturing processes of the spherical bearing 1 can be rationalized. Further, a plane surface will not be needed on the end surface 32b of the outer race 32 to connect the retainer 34 (see FIGS. 6 and 7) so as to give more freedom in a design of the spherical bearing 1. And, there is no projected member within the edge portion 2b of the inner spherical surface 2a of the outer race 2 and the end surface 4b of the side wall 4a of the seal groove 4 is formed within an inner diameter surface having a given diameter (D in FIG. 3) thereby preventing the shaft not shown fixed in the inner race 3 from being interfered with, which secures a swingable range of the shaft.

In addition, in the embodiment of the sealing system of the spherical bearing 1, since the side wall 4a of the seal groove 4 is deformed by being bent inward with the press die 6, the seal 5 can be tightly fixed by the seal groove 4; moreover, since the seal 5 is pressed according to the deformation of the side wall 4a, the seal 5 is closely abutted to the spherical surface 3a of the inner race 3 thereby increasing the sealing function of the spherical bearing 1. Further, even if the sealing function is deteriorated, the function can be easily recovered by repressing with the press die 6.

According to the first aspect of the present invention, a sealing system of a spherical bearing is constituted in such a manner that annular seal grooves are formed on an inner spherical surface of an outer race, seals fitted in the seal grooves are abutted to spherical surfaces of inner races. Unlike a conventional sealing system of a spherical bearing, there is no need for a retainer provided with a seal to be connected to an end of the outer race by welding, etc. thereby being able to rationalize manufacturing processes of the spherical bearing. Moreover, there is no need for a plane portion to be provided on an end surface of the outer race for connecting with the retainer, which gives more freedom for the design of the spherical bearing. In addition, since there is no projected member within its opening on the inner spherical surface of the outer race and the end face of the side wall of a seal groove is formed within the inner diameter having a given diameter, the interference with the shaft fixed in the inner race can be avoided so as to secure the swingable range of the shaft.

According to the second aspect of the present invention, since a side wall of a seal groove is deformed by being bent inward with the press die, the seal is fixed more tightly by the seal groove; moreover, since the seal is pressed according to the deformation of the side wall of the seal groove, the seal can be more tightly abutted to the spherical surface of the inner race so as to improve the sealing function of the spherical bearing. Further, even if the sealing function is deteriorated, the function can be easily recovered by repressing with the press die.

What is claimed is:

1. A sealing system of a spherical bearing characterized in that, in a spherical bearing in which spherical surfaces of a split type inner race are slidably supported by an inner spherical surface of an outer race, annular seal grooves are provided with a given space from an edge of said inner spherical surface of said outer race and seals are fit in said seal grooves.

2. The sealing system of the spherical bearing according to claim 1, wherein a side wall of said seal groove is bent inward.

* * * * *